(12) United States Patent
Takaragi (10) Patent No.: US 6,366,685 B1
(45) Date of Patent: Apr. 2, 2002

(54) IMAGE PROCESSING APPARATUS AND METHOD AND STORING MEDIUM

(75) Inventor: Yoichi Takaragi, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/158,822

(22) Filed: Sep. 23, 1998

(30) Foreign Application Priority Data

Sep. 30, 1997 (JP) ............................................. 9-266611

(51) Int. Cl.⁷ ................................................. G06K 9/00
(52) U.S. Cl. ........................ 382/140; 382/100; 396/319
(58) Field of Search ................................. 382/140, 115, 382/284, 232, 100; 355/40; 380/54; 396/319

(56) References Cited

U.S. PATENT DOCUMENTS

| | | | | |
|---|---|---|---|---|
| RE31,692 E | * | 10/1984 | Tyburski et al. ................ 382/7 |
| 5,257,119 A | | 10/1993 | Funada et al. ............... 358/438 |
| 5,457,540 A | | 10/1995 | Kajita ........................ 358/296 |
| 5,748,783 A | * | 5/1998 | Rhoads ........................ 382/232 |
| 5,768,426 A | * | 6/1998 | Rhoads ........................ 382/232 |
| 5,822,436 A | * | 10/1998 | Rhoads ......................... 380/54 |
| 5,859,920 A | * | 1/1999 | Daly et al. ................... 382/115 |
| 5,905,819 A | * | 5/1999 | Daly .......................... 382/284 |
| 5,949,524 A | * | 9/1999 | Patton et al. .................. 355/40 |

\* cited by examiner

*Primary Examiner*—Leo Boudreau
*Assistant Examiner*—M. B. Choobin
(74) *Attorney, Agent, or Firm*—Fitzpatrick, Cella, Harper & Scinto

(57) ABSTRACT

It is an object to prevent an abuse of a print-out copy image as much as possible even if an image which was optically recorded in a film is printed out. For example, it is an object to enable information of an author to be obtained as much as possible so long as a copy image is used. To accomplish the objects, an image processing apparatus of the invention has optical reading means for optically reading a film and generating image data, magnetic reading means for magnetically reading the film and generating predetermined additional information, adding means for adding the predetermined additional information to the image data so that it is hard to be discriminated by the human eyes, and output means for outputting the image data to which the predetermined additional information was added.

22 Claims, 9 Drawing Sheets

IMAGE PROCESSING APPARATUS AND METHOD AND STORING MEDIUM

BACKGROUND OF THE INVENTION

1. Field of the Invention

The invention relates to image processing apparatus and method for adding predetermined additional information to inputted image data and relates to a storing medium.

2. Related Background Art

In recent years, the spread of a film which is what is called an APS film having a magnetic recording portion in which a magnetic material is coated on a part of a silver salt film to optically record an image has started. Photographing parameters such as photographing date and time of a camera and the like are usually recorded in the magnetic recording portion.

In a conventional color copying apparatus, on the other hand, a technique for printing out a film image by using a film projector is known.

However, hitherto, since a literary work or the like can be also printed out by using the film projector as mentioned above, there is a problem such that literary works overflow irrespective of a will of the author.

SUMMARY OF THE INVENTION

The invention is made to solve the above problem and it is an object of the invention that even if an image optically recorded on a film is printed out, the abuse of the printed copy image is prevented as much as possible.

Particularly, it is another object of the invention to enable information of the author to be obtained as much as possible so long as such a copy image is used.

To accomplish the above objects, according to a preferred embodiment of the invention, there is provided an image processing apparatus comprising:

optical reading means for optically reading a film and generating image data;

magnetic reading means for magnetically reading the film and generating predetermined additional information;

adding means for adding the predetermined additional information to the image data so that it is hard to be discriminated by the human eyes; and output means for outputting the image data to which the predetermined additional information was added.

The above and other objects and features of the present invention will become apparent from the following detailed description and the appended claims with reference to the accompanying drawings.

BRIEF DESCRIPTION OF THE DRAWINGS

FIG. 8 is comprised of FIG. 8A and FIG. 8B showing diagram illustrating an operating procedure in the second embodiment.

DETAILED DESCRIPTION OF THE PREFERRED EMBODIMENTS

An embodiment of the invention will now be described hereinbelow with reference to the drawings.

Figure 1:
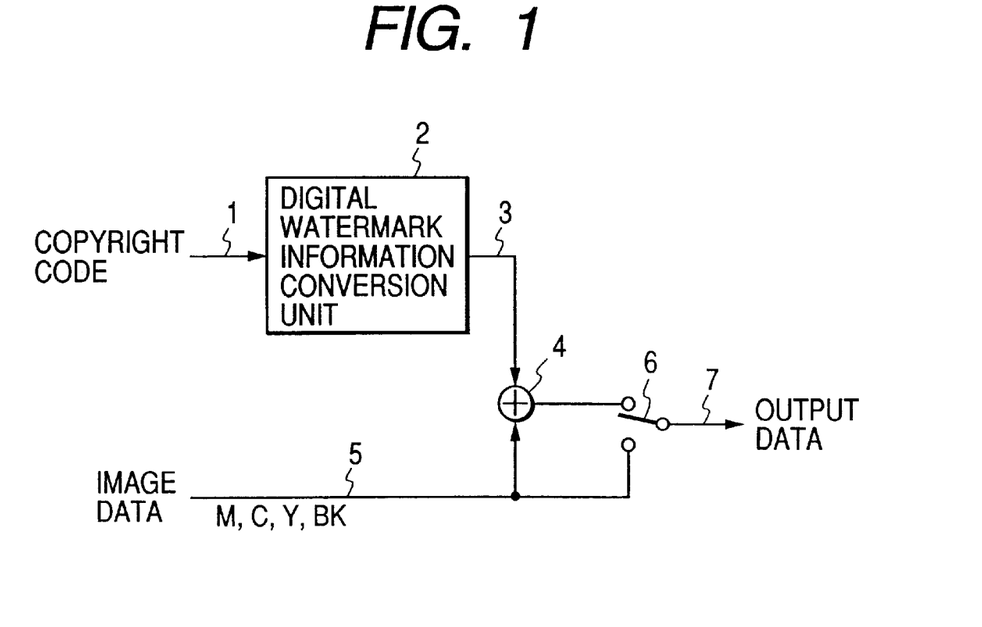
FIG. 1 is a block diagram showing the first embodiment of the invention.

FIG. 1 shows the first embodiment of the invention.

In FIG. 1, a copyright code 1 read out from a magnetic recording portion of an APS film (not shown) by a magnetic head is converted into digital watermark information 3, which will be explained hereinlater, by an digital watermark information conversion unit 2 and, after that, it is sent to a synthesizing unit 4.

On the other hand, image data 5 which was read out from the APS film by an image pickup device and was A/D converted is sent to the synthesizing unit 4 and is synthesized with the digital watermark information 3. Output data 7 from the synthesizing unit 4 can be copied and printed out by a copying apparatus or can be preserved as an image filing into a storing apparatus. When there is no copyright code 1, a selector 6 is switched so as to allow the image data 5 to be transmitted.

As image data 5 in case of printing out, actually, R, G, and B signals read out by the image pickup device are converted into image data for printing comprising M, C, Y, and Bk signals as will be explained hereinlater and this image data is used. However, the invention is not limited to such image data but other signals such as RGB, Lab, or the like can be also used.

Figure 2:
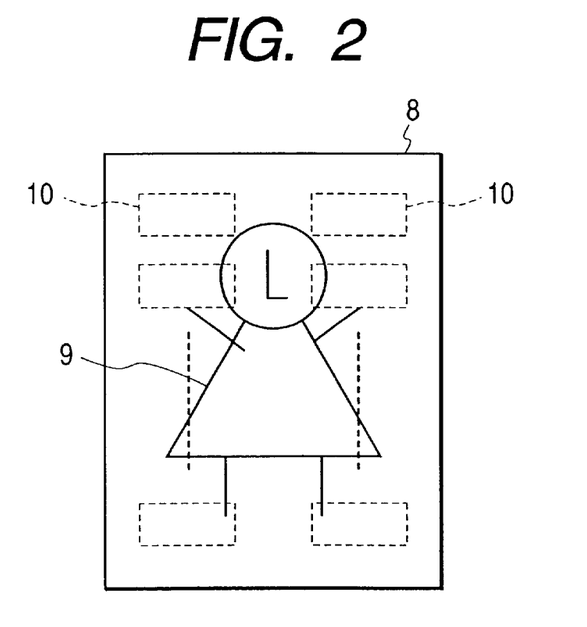
FIG. 2 is a diagram showing a printed image.

FIG. 2 shows a copy image 8 which was printed out. A copyright code 10 which was embedded as digital watermark information into an image optically read out from the APS film is printed together with the image 9. The diagram shows a case where a plurality of same copyright codes 10 are arranged in two lines and printed.

Therefore, even if such a copy image 8 is seen by the eyes, the images (digital watermark information) showing the copyright codes 10 are inconspicuous and the inherent image 9 does not deteriorate. Further, since the copyright codes 10 are in a state where they were always embedded in the image 9, it is very difficult to falsify. Even if the copyright codes are falsified, the picture quality of the image 9 also deteriorates in such a case.

A method of obtaining the digital watermark information will now be described.

As a method of converting specific additional information such as a copyright code or the like into digital watermark information serving as information which is hard to be recognized by the human eyes and superimposing it into the original image, for example, in case of superimposing the digital watermark information into a color image which is multivalue expressed, there is a method of adding a light Y (yellow) dot image into the image on the basis of the specific additional information. That is, the additional information is expressed by an arrangement state of the dots. In case of a printer for expressing (printing) each of the Y, M, C, and Bk signals by a binary value instead of printing a multivalue color image, for example, there is a method of forcedly deviating each dot arrangement in a manner such that the dots of the image of the Y component are arranged at dot intervals of an odd number or an even number every line in accordance with the value of "1" or "0" of the specific additional information. There is another method of frequency modulating the image data in accordance with the specific additional information or the like. The invention is realized by performing any one of the above embedding (adding) methods of the additional information. Those methods have been disclosed in U.S. Pat. No. 5,457,540 and the like.

In the invention, the method of superimposing the digital watermark information into an image is not limited to one method. However, an effect which is obtained by combining it to a specific method is large.

A specific construction to realize the first embodiment will now be described.

Figure 3:
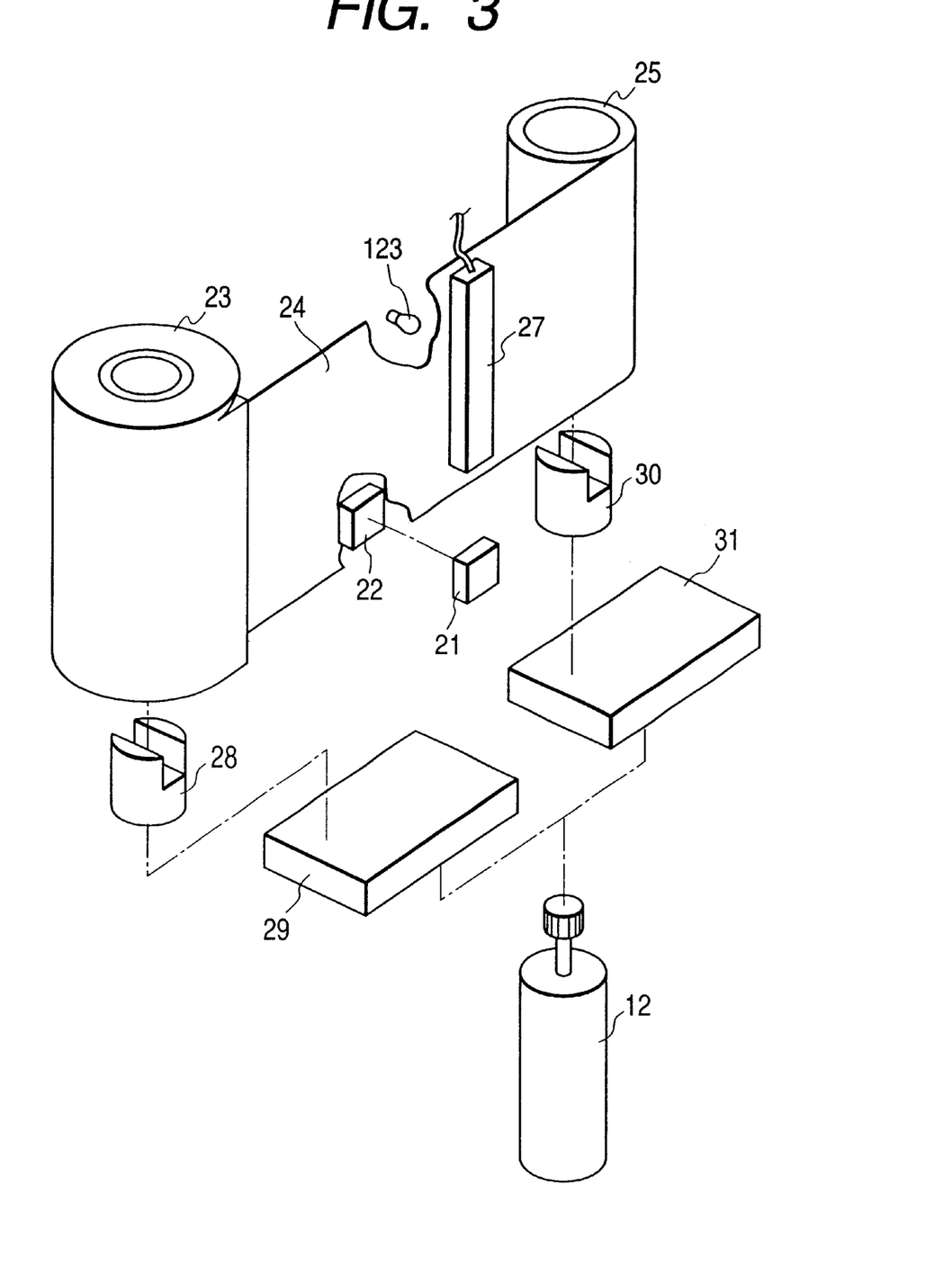
FIG. 3 is a diagram showing a film feeding unit and a magnetic reading unit.

FIG. 3 shows a construction of a film feeding unit and a magnetic reading unit which are provided in the foregoing projector.

In FIG. 3, reference numeral 21 denotes a magnetic head to read additional information such as copyright code, photographing date/time data, or the like which was magnetically recorded; 22 a pressing pat of the magnetic head 21; 23 a film cartridge; 24 a film (APS film) having a magnetic recording portion on which a magnetic material was coated; 25 a spool to take up the film 24; and 123 an illumination light source for an image scanner unit, which will be explained hereinlater.

Reference numeral 28 denotes a feeding fork to feed the film; 29 a gear unit to feed the film; 30 a fork to drive the spool 25; 31 a gear unit to drive the spool; and 12 a feeding motor which is connected to the feeding gear unit 29 and spool driving gear unit 31.

The film 24 moves through the gear units 29 and 31 by the rotating operation of the feeding motor 12 and the copyright code and photographing date/time data recorded on the film surface are read out by the magnetic head 21 during the movement of the film.

Figure 4:
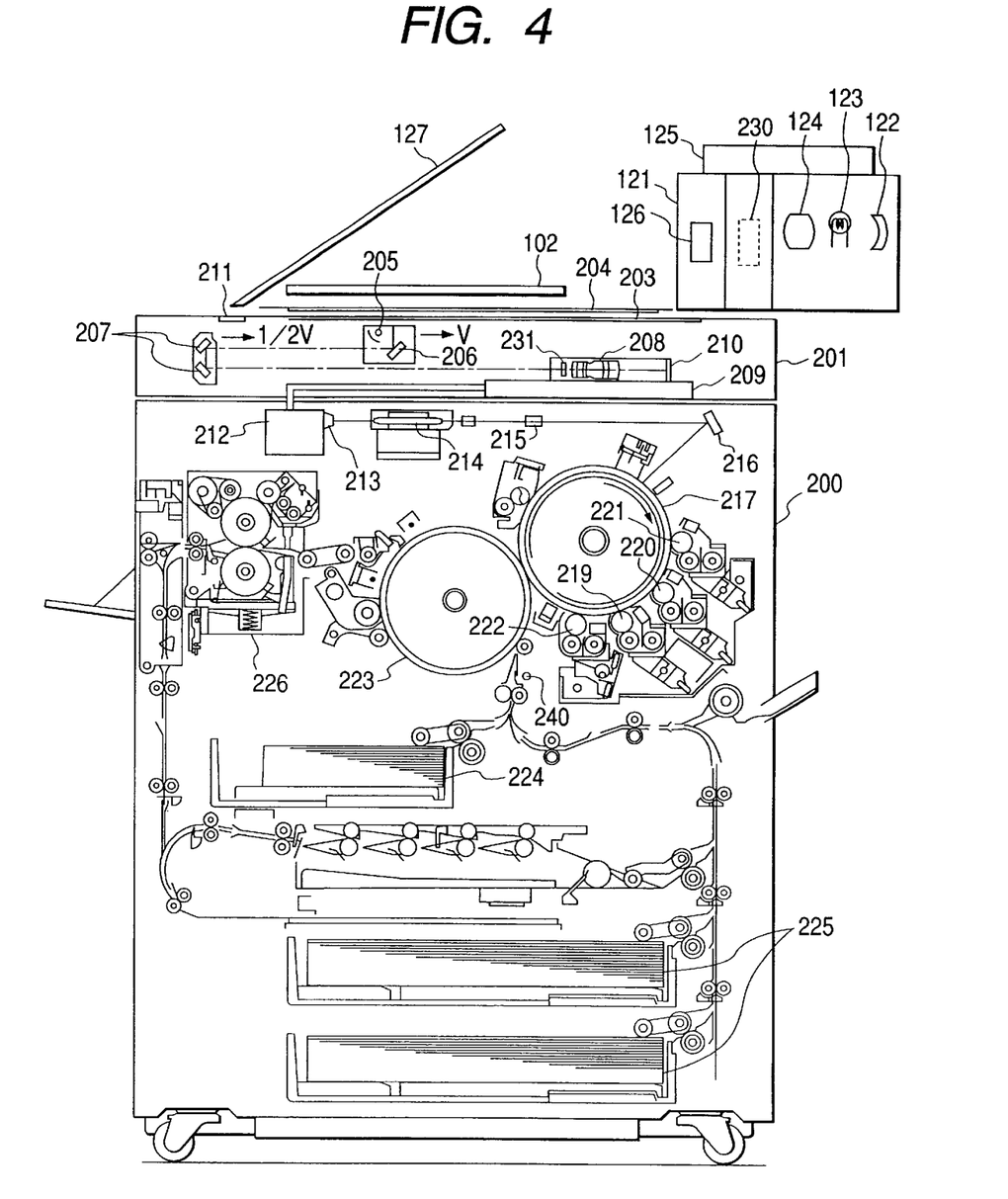
FIG. 4 is a cross sectional constructional diagram of a color copying apparatus.

FIG. 4 is a diagram showing a cross sectional construction of a color copying apparatus which is used in the embodiment.

In FIG. 4, reference numeral 201 denotes an image scanner unit for read an original image serving as an original in color and executing a necessary digital signal process; 200 a printer unit for printing and outputting the image onto a recording paper in full color in correspondence to the original image read by the image scanner unit 201; and 121 a projector unit serving as a foregoing projector to perform the projection of the APS film. The projector unit includes the APS film feeding unit and magnetic recording reading unit in FIG. 3.

In the image scanner unit 201, an original 204 put on an original base glass plate (platen) 203 is illuminated by the light from a halogen lamp 205. The reflected light from the original 204 is led to mirrors 206 and 207 and is formed as an image onto a CCD 3-line sensor (hereinafter, simply referred to as a "CCD") 210 serving as an image pickup device by a lens 208. An infrared rays cut filter 231 is provided for the lens 208.

The CCD 210 color separates light information from the original 204, reads red (R), green (G), and blue (B) components of the full color image information, and after that, sends them to an image signal processing unit 209. Each color component reading sensor array of the CCD 210 is constructed by 5000 pixels. Thus, an image in the landscape direction of 297 mm of the original of the A3 size as a maximum size in the original which is put on the original base glass plate 203 can be read at a resolution of 400 dpi.

The halogen lamp 205 and mirror 206 are moved at a velocity of V and the mirror 207 is moved at a velocity of (1/2)V in the direction (sub scanning direction) perpendicular to the electric scanning direction (main scanning direction) of the line sensor 210, thereby scanning the whole surface of the original 204.

A standard white plate 211 is used to generate correction data for correcting the data read by the R, G, and B sensors in the CCD 210. The standard white plate 211 shows almost uniform reflecting characteristics for the visible light and is white for the visible light. The output data from the R, G, and B sensors is corrected by using the standard white plate 211.

The image signal processing unit 209 switches the read-out R, G, and B image signals and an image signal sent from an external host computer or the like, inputs the switched image signals, electrically processes the inputted image signals, and decomposes into components of magenta (M), cyan (C), yellow (Y), and black (Bk). The image signal of each component is sent to the printer unit 200.

With respect to the original scan of once in the image scanner unit 201, one of the components of M, C, Y, and Bk is sent to the printer unit 200 (frame sequential image formation) and the print-out of one paper is completed by the original scan of total four times.

The printer unit 200 will now be described.

In the printer unit 200, the processed image signals of M, C, Y, and Bk are sent to a laser driver 212. The laser driver 212 modulation drives a semiconductor laser 213 in accordance with each of the transmitted image signals. The laser beam from the semiconductor laser 213 scans on a photosensitive drum 217 through a polygon mirror 214, an F-θ lens 215, and a mirror 216.

Four developing units of a magenta developing unit 219, a cyan developing unit 220, a yellow developing unit 221, and a black developing unit 222 are alternately come into contact with the photosensitive drum 217 and develop electrostatic latent images of M, C, Y, and Bk formed on the photosensitive drum 217 by corresponding toner, respectively.

A recording paper fed from a paper cassette 224 or 225 is wrapped around a transfer drum 223. When the electrostatic latent image of each component of M, C, Y, and Bk formed on the photosensitive drum 217 is developed by the toner, the recording paper is come into contact with the photosensitive drum 217 and is rotated, thereby sequentially transferring the developed toner images onto the paper.

After the toner images were sequentially transferred to the paper with regard to the four colors of M, C, Y, and Bk as mentioned above, the paper passes through a fixing unit 226 and is ejected.

A paper feed resist sensor 240 generates a timing to start the film reading operation, which will be explained hereinlater, from a timing when the fed paper transverses the sensor 240.

An APS film projecting unit including the projector unit 121 will now be described.

Reference numeral 230 denotes a film feeding unit and magnetic recording reading unit described in FIG. 3; 123 a halogen lamp in FIG. 3; 122 a reflecting plate to reflect the light of the halogen lamp 123; 124 a condenser lens; 126 a projection lens; 127 a reflecting mirror; 102 a Fresnel lens to form a film image onto the reading unit in the scanner; 125 an automatic carrier for continuously conveying a plurality of films stored in a tray (not shown) to a reading position while rotating and moving them, for reading them, and after that, for extracting read images from the reading position. By projecting the film transmission light to the original base glass plate 203 by using the projector unit 121, the film images can be read by the CCD 210.

Figure 5:
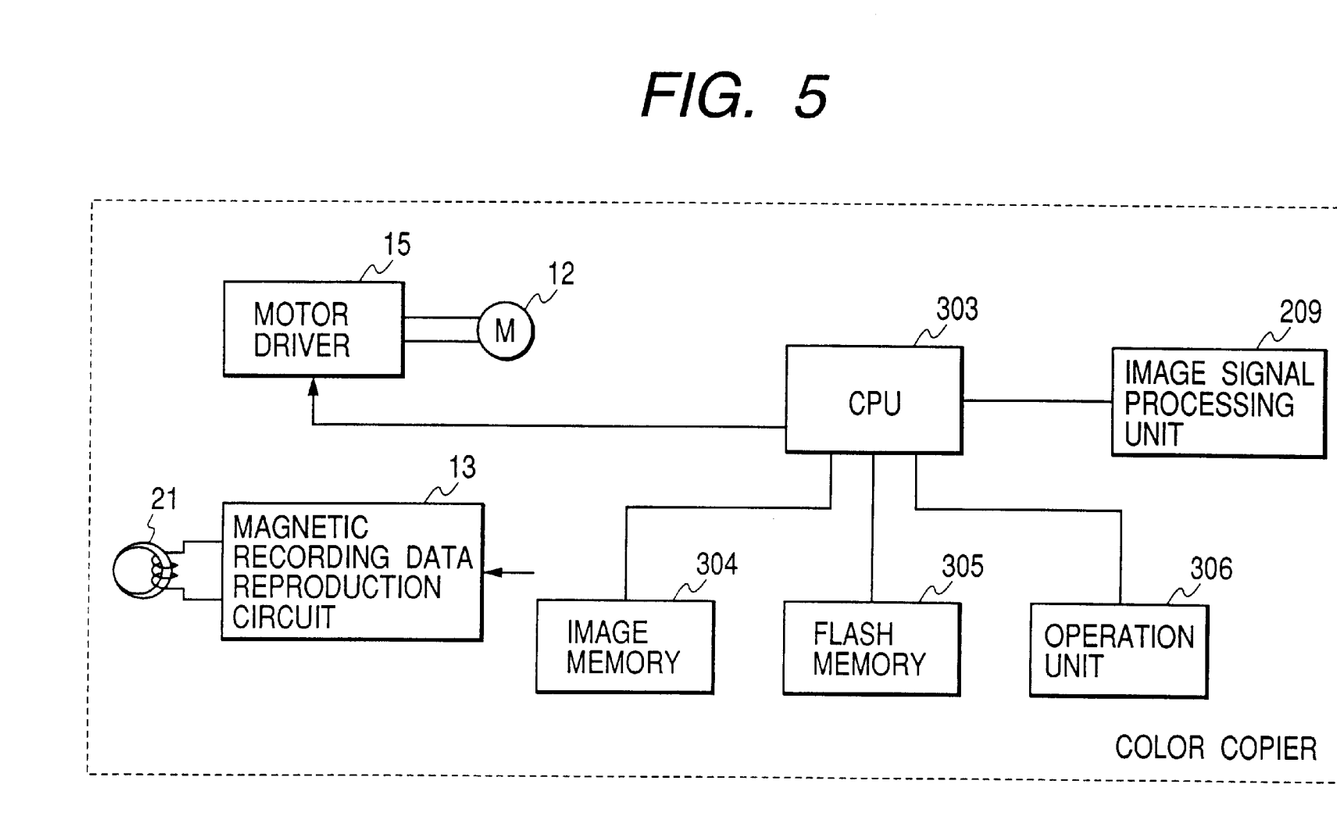
FIG. 5 is a diagram showing an electric control portion of the color copying apparatus.

FIG. 5 is a diagram showing an electric control portion of an image processing system in the color copying apparatus having the projector unit 121 described above.

In FIG. 5, reference numeral 13 denotes a magnetic recording data reproduction circuit to read the magnetic data on the film 24; 15 a motor driver to drive the feeding motor 12; and 304 an image memory to store the image data or magnetic data read out from the film 24.

Reference numeral 303 denotes a CPU to control the whole apparatus; 305 a flash memory serving as a storing medium according to the invention to store an execution control program or the like of the apparatus; 306 an operation unit to input various instructions; and 209 the image signal processing unit in FIG. 4 for performing various image processes which are necessary in the copying apparatus. The image signal processing unit 209 includes the construction of FIG. 1. As a storing medium, besides the flash memory, a semiconductor memory, an optical disk, a magnetooptic disk, a magnetic medium, or the like can be also used.

Figure 6:
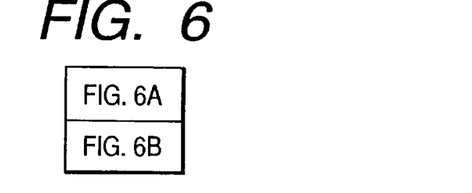
FIG. 6 is comprised of FIG. 6A and FIG. 6B showing diagram illustrating an operating procedure in the first embodiment.
Figure 6A:
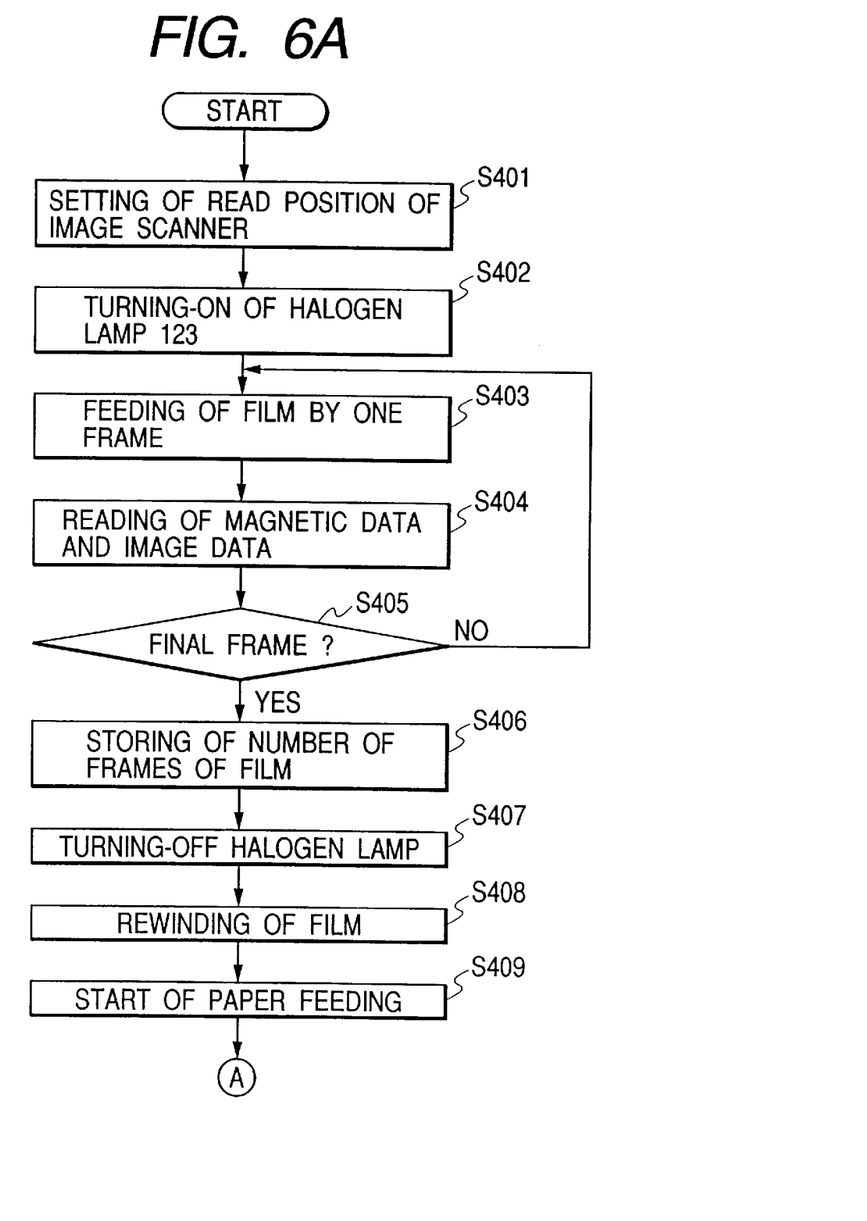
Figure 6B:
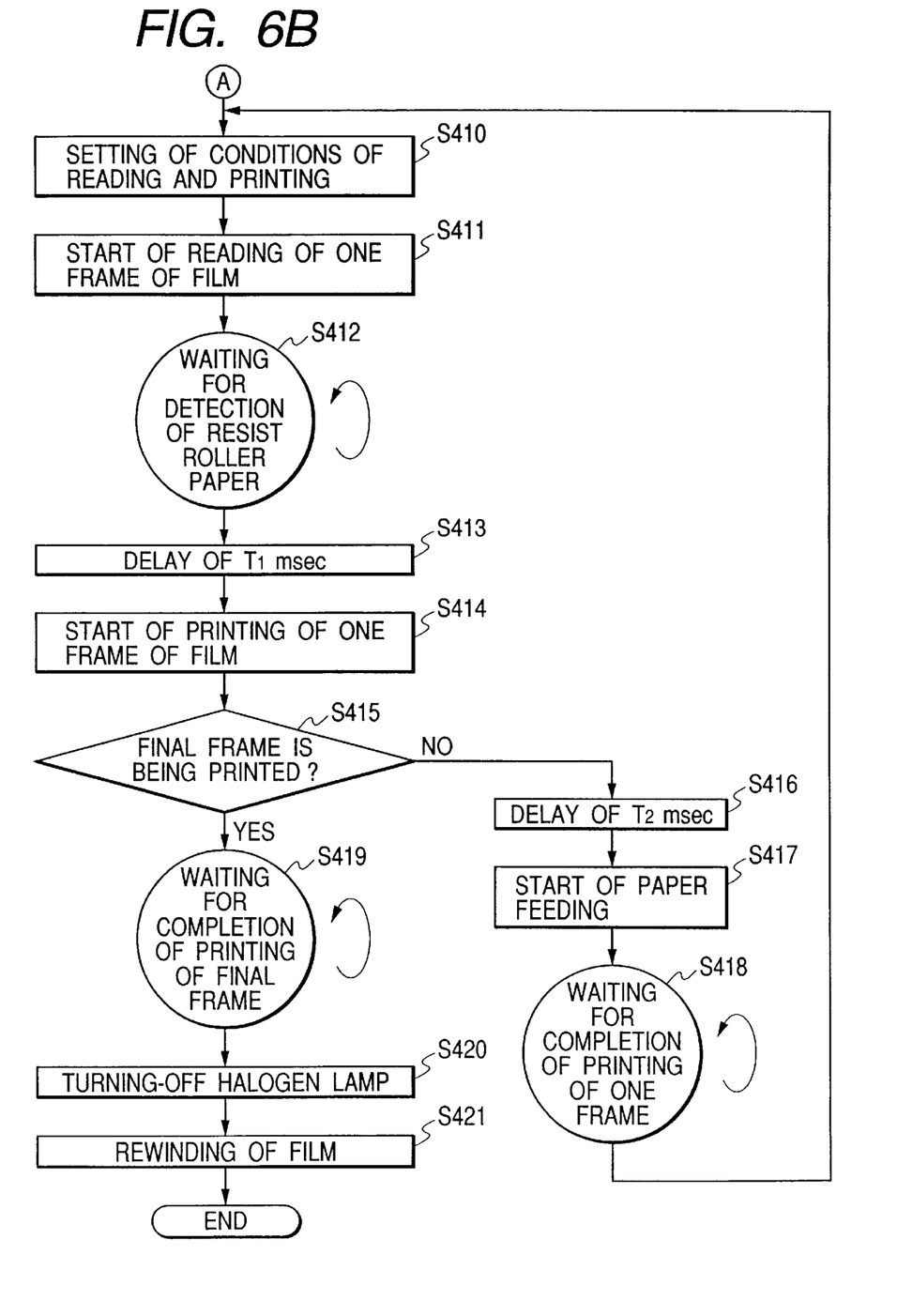

FIGS. 6A and 6B are flowcharts showing processes of the CPU 303 regarding the reading operation from the film 24 and the image forming operation.

In steps S401 to S407, the magnetic data and image data of the film 24 are previously read and processing conditions and the number of frames of the film at the time of printing are set. In steps S408 to S420, the film image reading operation and the paper feeding operation are executed in parallel.

The read image data and magnetic data are stored into the memory 304 in FIG. 5. A luminance histogram is formed from the read image data every signal of RGB and various image signal processing parameters which are set into the image signal processing unit 209 are calculated at the time of reading and printing of the image data. The technical contents regarding the calculation of the image signal processing parameters are not described in detail here since they are well known as a reading process of a film projector in a color copying apparatus. A part of the image signal processing parameters can be also formed on the basis of the magnetic data.

Each processing step will now be described in detail.

In step S401, the mirrors 206 and 207 in FIG. 4 are driven, thereby fixing a scanner reading position to a specific position of the Fresnel lens 102. In step S402, the halogen lamp 123 is turned on. In step S403, a signal is outputted to the motor driver 15, thereby rotating the feeding motor 12 and moving the film 24 by a distance of one frame.

In step S404, the image data is read by the CCD 210 during the feeding operation of the film and, at the same time, the magnetic data recorded in the magnetic recording portion of the film 24 is read out by the magnetic head 21. A copyright (author) code, a frame number, a photographing date/time, image size information, color temperature information, and image direction information have been stored in the magnetic data which is read in this instance. The image direction information indicates whether the image has been obtained by photographing at a portrait position or a landscape position. The photographing size information indicates whether the photographing image has a normal size or a panorama size.

In step S405, a check is made to see if the frame read in step S404 is the final frame. In step S406, information indicating the number of read frames of the film is stored into the image memory 304. In step S407, the halogen lamp 123 is turned off. In step S408, the film is rewound by a distance corresponding to the number of frames which have already been read. In step S409, the paper feeding is started from the paper cassette prior to reading the image data which is necessary when it is actually printed.

In step S410, the image signal processing parameters stored in the image memory 304 in step S404 are set into the image signal processing unit 209. The digital watermark information conversion unit 2 and selector 6 in FIG. 1 are set on the basis of the information of the copyright code which was magnetically stored. On the basis of the photographing size information (normal size/panorama size) which was magnetically stored, a reading area is determined and the image signal processing unit 209 is set so as to generate a corresponding reading area signal.

In step S411, the reading operation of the image data of the film 24 is started. The feeding motor 12 is driven synchronously with an operating speed of the CCD 210, thereby moving the film 24. The read image data is stored into the image memory 304.

By the above operation, the image data of the film 24 as much as one frame from the CCD 210 can be stored into the image memory 304 without moving the mirrors 206 and 207.

Thus, the influence by the movement of the mirror surfaces due to the movement of the mirrors 206 and 207 is eliminated at the time of reading of the image data and the R, G, and B signals of a small color deviation can be obtained.

In step S412, the apparatus waits for the arrival at the paper feed resist sensor 240 with respect to the paper in which the paper feeding was started in step S409. When the paper reaches, step S413 follows and a timing to start the image formation is adjusted so as to be delayed by $T_1$ milliseconds so that the image is printed at a predetermined position on the paper. In step S414, on the basis of the image data for each frame stored in the image memory 304, the semiconductor laser 213 is driven and the image formation of one frame is started.

In step S415, a check is made to see if the frame of the film which is at present being printed is the minimum frame. If YES, the apparatus waits for the end of printing in step S419. The lamp is turned off in step S420. In step S421, the film is rewound. The printing process is finished. If NO, the processing routine advances to step S416 during the printing of the previous paper. In step S416, the timing is delayed by a predetermined time of $T_2$ milliseconds. That is, the timing to start the next paper feeding is adjusted to a timing when the printing of the next paper can be started immediately after completion of the printing of the paper which has previously been fed.

After the delaying process was finished in step S416, the next paper feeding is started prior to completion of the printing of the previous paper in step S417. In step S418, the apparatus waits for the end of the printing operation by the laser 213. When the printing operation is finished, the processing routine is soon returned to step S410. A processing procedure similar to that mentioned above is repeated.

By executing the reading operation of the image data of the film 24 and the paper feeding and printing operations in parallel by the above printing procedure, a whole processing speed of the film reading and printing operations can be improved. By reading the image while feeding the film by using a reading sensor of the reflected original, the film reading sensor can be omitted.

Figure 7:
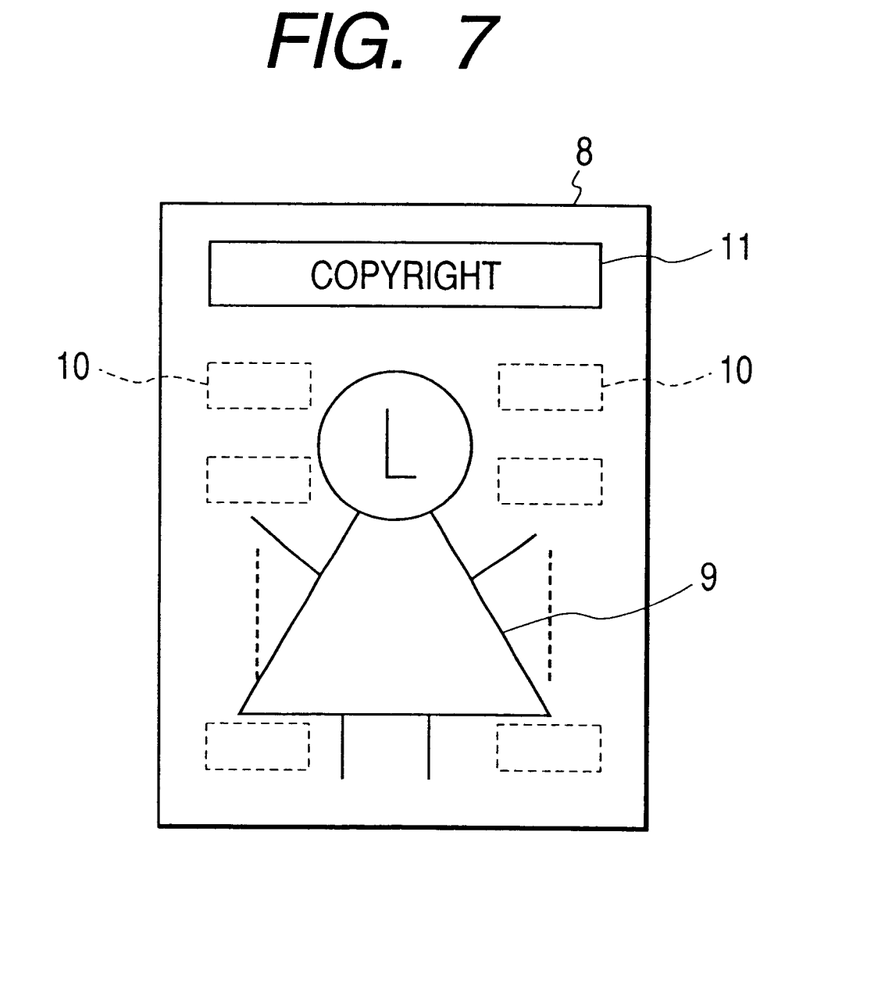
FIG. 7 is a diagram showing a printed image in the second embodiment.

FIG. 7 is a diagram showing the second embodiment of the invention.

In the first embodiment, the copyright code has been recorded as digital watermark information. However, since the copyright code has been embedded as digital watermark information into the print image, whether the copyright code exists in the print or not cannot be discriminated at a glance.

In the embodiment, when the copyright code has been recorded on the APS film, as shown in FIG. 7, the copyright code is converted into specific characters (COPYRIGHT) 11 to assert the copyright and these characters 11 are printed, thereby enabling a fact that the copyright code has been recorded as digital watermark information to be clearly recognized as a visible image.

Figures 8, 8A:
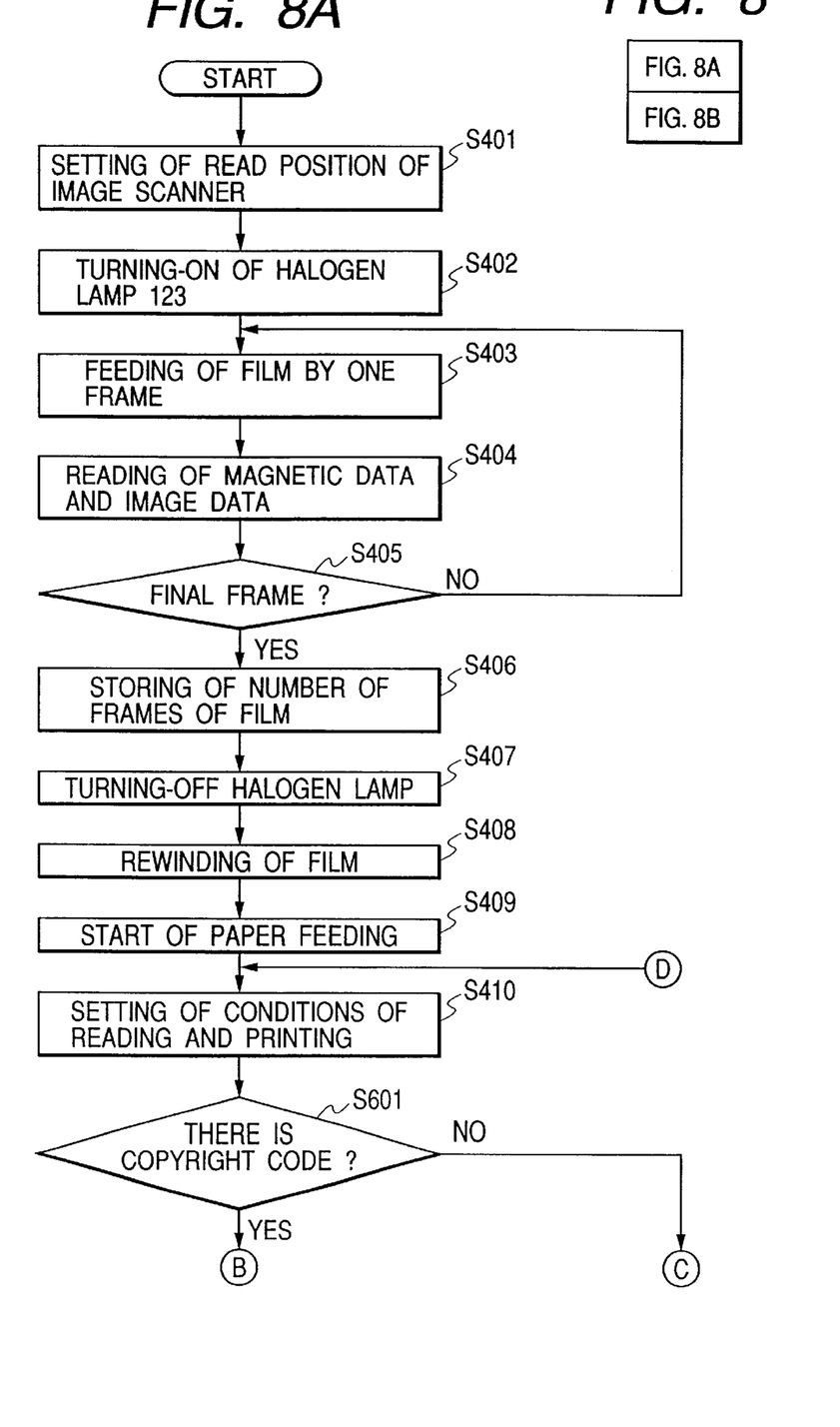
Figure 8B:
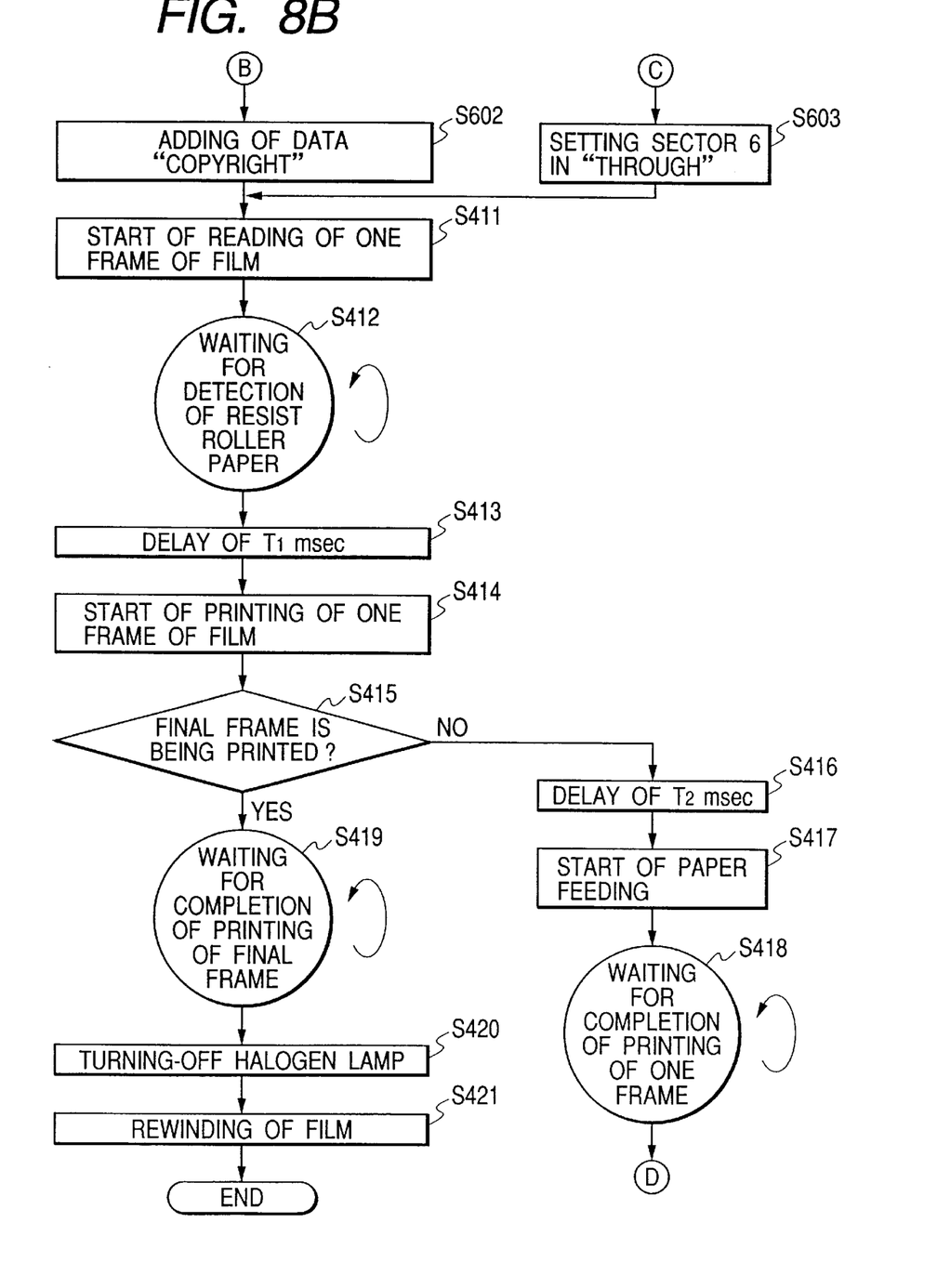

FIGS. 8A and 8B are flowcharts for describing the process of the CPU 303 according to the second embodiment.

In FIGS. 8A and 8B, processes in steps S401 to S421 are the same as those in FIGS. 6A and 6B. That is, if the copyright code has been recorded in the APS film, the digital watermark information corresponding to this code is embedded so that it is hard to be discriminated by the human eyes. In step S601, subsequently, a check is made to see if the copyright code exists in the APS film magnetic information. If the copyright code exists, a process in step S602 is executed. If it does not exist, a process in step S603 is executed.

In step S602, the image data "COPYRIGHT" to assert the copyright is developed in the image memory 304 and a control is made so that the visible characters "COPYRIGHT" are printed at the beginning of the printing.

In step S603, the selector 6 in FIG. 1 is controlled so as to set such that the digital watermark information is not added, and the image memory 304 is cleared so as not to print the characters "COPYRIGHT".

With the above construction, not only the specific additional information can be added so that it is difficult to discriminate such information by the human eyes but also the existence of such information can be displayed as a visible image.

Although each of the embodiments has been described above with respect to the case where the original is used as an APS film and the copyright code is used as specific information, the invention is not limited to such an example but can be also applied to a case of reading an original on which some specific information has been recorded together with an image. Thus, a signal in which specific information has been embedded as digital watermark information in an image can be obtained.

The original is not limited to the image signal obtained by reading the original. An image which is derived by a digital camera can be used or a computer graphics image can be also used. In brief, any image can be used so long as it is an image in which specific information such as copyright information or the like has been embedded.

According to the invention as described above, into the image obtained from an original, the specific information derived from the same original is embedded as what is called digital watermark information which is hard to be recognized by the human eyes, so that the specific information can be held without deteriorating the image in a form such that it is difficult to falsify. Particularly, the copyright code recorded in the APS film is superimposed as digital watermark information into the image data, so that the information regarding the copyright can be held in a form such that it is difficult to falsify.

By adding the digital watermark information after the fundamental process (RGB→YMCK conversion, enlargement·reduction, etc.) in case of forming an image signal for printing for the image read out from the film, the digital watermark information can be stably added onto the print.

In the case where the copyright code has been recorded on the APS film, since the information showing the copyright has been added to the print image (for instance, "COPYRIGHT" is added), information regarding the copyright can be clearly displayed.

The invention can be applied as a part of a system constructed by a plurality of equipment (for example, a host computer, interface equipment, a reader, a printer, and the like) or can be also applied as a part of an apparatus comprising one equipment (for instance, a copying apparatus or a facsimile apparatus).

The invention is not limited to only an apparatus and a method to realize the foregoing embodiments but the invention also incorporates a case where program codes of software to realize the above embodiments are supplied to a computer (CPU or MPU) in the above system or apparatus and the computer of the system or apparatus makes the above various devices operative in accordance with the program codes, thereby realizing the foregoing embodiments.

In this case, the program codes themselves of the software realize the functions of the foregoing embodiments. The program codes themselves and means for supplying the program codes to the computer, specifically speaking, a storing medium in which the program codes have been stored are also incorporated in the scope of the invention.

As such a storing medium to store the program codes, for example, it is possible to use a floppy disk, a hard disk, an optical disk, a magnetooptic disk, a CD-ROM, a magnetic tape, a non-volatile memory card, an ROM, or the like.

The above program codes are also incorporated in the scope of the invention in not only a case where the functions of the foregoing embodiments are realized by controlling the various devices by the computer in accordance with only the supplied program codes but also a case where the above embodiments are realized by the above program codes in cooperation with the OS (Operating System) which operates on the computer or another application software or the like.

Further, a case where the supplied program codes are stored into a memory provided for a function expansion board of a computer or a function expanding unit connected to the computer and, after that, a CPU or the like provided for the function expansion board or function expanding unit executes a part or all of the actual processes on the basis of instructions of the program codes, and the foregoing embodiments are realized by the processes is also incorporated in the scope of the invention.

The present invention is not limited to the foregoing embodiments but many modifications and variations are possible within the spirit and scope of the appended claims of the invention.

What is claimed is:

1. An image processing apparatus comprising:
    optical reading means for optically reading a film and generating image data;
    magnetic reading means for magnetically reading said film and generating predetermined additional information;

adding means for adding said predetermined additional information to said image data so that it is hard to be discriminated by the human eyes; and output means for outputting the image data to which said predetermined additional information was added, wherein said image data and said predetermined additional information are generated from a same film.

2. An apparatus according to claim 1, wherein said film is an APS film.

3. An apparatus according to claim 1, wherein said adding means embeds said predetermined additional information as digital watermark information into said image data.

4. An apparatus according to claim 1, wherein said optical reading means is a color scanner.

5. An apparatus according to claim 1, wherein said magnetic reading means is a film scanner.

6. An apparatus according to claim 1, wherein said output means is a color printer.

7. An apparatus according to claim 1, wherein said image data is color image data comprising a plurality of components and said adding means adds said predetermined additional information by changing a part of said plurality of components.

8. An apparatus according to claim 1, wherein said predetermined additional information is copyright information.

9. An apparatus according to claim 1, further comprising second adding means for adding a visible image showing that said predetermined additional information is added to said image data to said image data.

10. An image processing method comprising:

an optical reading step of optically reading a film and generating image data;

a magnetic reading step of magnetically reading said film and generating predetermined additional information;

an adding step of adding said predetermined additional information to said image data so that it is hard to be discriminated by the human eyes; and an outputting step of outputting the image data to which said predetermined additional information was added, wherein said image data and said predetermined additional information are generated from a same film.

11. A storing medium in which an image processing program has been stored so as to be able to be read out into a computer, wherein said program comprises:

an optical reading step of optically reading a film and generating image data;

a magnetic reading step of magnetically reading said film and generating predetermined additional information;

an adding step of adding said predetermined additional information to said image data so that it is hard to be discriminated by the human eyes; and an outputting step of outputting the image data to which said predetermined additional information was added, wherein said image data and said predetermined additional information are generated from a same film.

12. An image processing apparatus comprising:

first input means for inputting image data obtained by reading a predetermined film by optical reading means;

second input means for inputting additional information obtained by reading said predetermined film by magnetic reading means;

adding means for adding said predetermined additional information to said image data so that it is hard to be discriminated by the human eyes; and output means for outputting the image data to which said predetermined additional information was added, wherein said image data and said predetermined additional information are generated from a same film.

13. An apparatus according to claim 12, wherein said film is an APS film.

14. An apparatus according to claim 12, wherein said adding means embeds said predetermined additional information as digital watermark information into said image data.

15. An apparatus according to claim 12, wherein said optical reading means is a color scanner.

16. An apparatus according to claim 12, wherein said magnetic reading means is a film scanner.

17. An apparatus according to claim 12, wherein said output means is a color printer.

18. An apparatus according to claim 12, wherein said image data is color image data comprising a plurality of components and said adding means adds said predetermined additional information by changing a part of said plurality of components.

19. An apparatus according to claim 12, wherein said predetermined additional information is copyright information.

20. An apparatus according to claim 12, further comprising second adding means for adding a visible image showing that said predetermined additional information is added to said image data to said image data.

21. An image processing method comprising:

a first inputting step of inputting image data obtained by reading a predetermined film by optical reading means;

a second inputting step of inputting additional information obtained by reading said predetermined film by magnetic reading means;

an adding step of adding said predetermined additional information to said image data so that it is hard to be discriminated by the human eyes; and an outputting step of outputting the image data to which said predetermined additional information was added, wherein said image data and said predetermined additional information are generated from a same film.

22. A storing medium in which an image processing program has been stored so as to be able to be read out into a computer, wherein said program comprises:

a first inputting step of inputting image data obtained by reading a predetermined film by optical reading means;

a second inputting step of inputting additional information obtained by reading said predetermined film by magnetic reading means;

an adding step of adding said predetermined additional information to said image data so that it is hard to be discriminated by the human eyes; and an outputting step of outputting the image data to which said predetermined additional information was added, wherein said image data and said predetermined additional information are generated from a same film.

* * * * *

UNITED STATES PATENT AND TRADEMARK OFFICE
CERTIFICATE OF CORRECTION

PATENT NO.   : 6,366,685 B1
DATED        : April 2, 2002
INVENTOR(S)  : Takaragi It is certified that error appears in the above-identified patent and that said Letters Patent is hereby corrected as shown below:

Column 2
Line 16, "an" should read -- a --; and
Line 25, "filing into" should read -- file in --.

Column 3,
Line 41, "read" should read -- reading --.

Column 4,
Line 18, "into" should read -- them into --; and
Lines 37 and 46, "come" should read -- brought --.

Column 6,
Line 37, "reaches" should read -- reaches this point, --.

Column 9,
Line 30, "data to said image data." should read -- data --.

Column 10,
Line 32, "data to said image data." should read -- data --.

Signed and Sealed this

Twenty-fourth Day of June, 2003

JAMES E. ROGAN
*Director of the United States Patent and Trademark Office*